(12) United States Patent
Yasrebi et al.

(10) Patent No.: US 6,920,913 B2
(45) Date of Patent: Jul. 26, 2005

(54) METHOD FOR PROCESSING CASTING MATERIALS TO INCREASE SLURRY LIFETIME

(75) Inventors: Mehrdad Yasrebi, Clackamas, OR (US); Karl Milton Taft, III, Portland, OR (US); David Howard Sturgis, Boring, OR (US); Michael Gerald Sorbel, Oregon City, OR (US); Mark E. Springgate, Portland, OR (US); Douglas Gene Nikolas, Battleground, WA (US)

(73) Assignee: PCC Structurals, Inc., Portland, OR (US)

( * ) Notice: Subject to any disclaimer, the term of this patent is extended or adjusted under 35 U.S.C. 154(b) by 132 days.

(21) Appl. No.: 10/431,881

(22) Filed: May 7, 2003

(65) Prior Publication Data

US 2004/0007345 A1 Jan. 15, 2004

Related U.S. Application Data

(63) Continuation-in-part of application No. PCT/US01/47696, filed on Nov. 7, 2001, which is a continuation-in-part of application No. 09/710,545, filed on Nov. 8, 2000, now Pat. No. 6,390,179.

(51) Int. Cl.⁷ .............................................. B22C 1/02
(52) U.S. Cl. ...................................... 164/517; 164/519
(58) Field of Search ................. 164/15, 165, 516–519, 164/361; 106/38.2, 38.27

(56) References Cited

U.S. PATENT DOCUMENTS

| 3,590,905 | A | * | 7/1971 | Watts et al. ................. 164/165 |
| 3,994,346 | A | * | 11/1976 | Brown ........................ 164/361 |
| 4,063,954 | A | * | 12/1977 | Brown ........................ 106/38.3 |
| 4,196,769 | A | | 4/1980 | Feagin |
| 4,947,927 | A | | 8/1990 | Horton |
| 4,996,084 | A | | 2/1991 | Elkachouty |
| 5,407,001 | A | | 4/1995 | Yasrebi et al. |
| 5,535,811 | A | | 7/1996 | Feagin |
| 5,624,604 | A | * | 4/1997 | Yasrebi et al. ................. 516/88 |
| 5,629,369 | A | * | 5/1997 | Guerra, Jr. ................... 524/493 |
| 5,630,465 | A | | 5/1997 | Feagin |
| 5,643,844 | A | | 7/1997 | Yasrebi et al. |
| 5,677,371 | A | | 10/1997 | Guerra |
| 6,345,663 | B1 | * | 2/2002 | Klug et al. ................. 164/361 |
| 6,390,179 | B1 | * | 5/2002 | Yasrebi et al. ............... 164/519 |

* cited by examiner

*Primary Examiner*—Kevin P. Kerns
(74) *Attorney, Agent, or Firm*—Klarquist Sparkman, LLP (57) ABSTRACT

Embodiments of a method for increasing the lifetime of a casting slurry are described. One feature of the disclosed embodiments comprises processing refractory materials that are used to form casting slurries to provide a substantial increase in slurry lifetime for slurries made using such processed materials compared to slurries made using materials not processed as described herein. One embodiment of the method comprises heat processing at least one refractory powder. Without limiting the invention to a theory of operation, processing is continued for a period of time sufficient to reduce the amount of hydration from a first hydration level to a second hydration level. A slurry is formed using the refractory powder at a hydration level which provides an increased slurry lifetime relative to the same material without processing according to the disclosed embodiments.

34 Claims, 7 Drawing Sheets

METHOD FOR PROCESSING CASTING MATERIALS TO INCREASE SLURRY LIFETIME

CROSS REFERENCE TO RELATED APPLICATIONS

This application is a continuation-in-part of pending International Application No. PCT/US01/47696, filed Nov. 7, 2001, which claims the benefit of U.S. patent application Ser. No. 09/710,545, filed Nov. 8, 2000, now issued as U.S. Pat. No. 6,390,179 on May 21, 2002.

FIELD

This invention concerns casting slurries, particularly investment casting slurries, and a method for processing mold-forming materials to decrease slurry aging and increase slurry lifetime.

BACKGROUND

Investment casting is a process for making articles, referred to as castings, from metals and alloys. Castings are formed by pouring molten metals or alloys into molds having an internal cavity shaped in the form of a desired article. The metal or alloy is allowed to solidify inside the mold, and the mold is then separated from the casting. The mold is typically made from refractory materials, such as ceramics.

Investment casting molds can be formed by a dip coating-process in which wax or polymeric "patterns" formed in the shape of a desired article are dipped into a casting slurry. A casting slurry is a system in which small particles, such as small particles of refractory materials, are substantially uniformly dispersed in a liquid. The liquid can be a variety of materials, such as water or an organic material, including but not limited to alcohols. The wet slurry material is allowed to at least partially dry to form a covering over the pattern. The pattern can be repetitively dipped to build up a coating of the desired thickness.

Aqueous slurries for processing ceramics are relatively inexpensive and environmentally safe. However, aqueous processing of some refractory materials, such as ceramics, is difficult because they dissolve in water over time. Organic-based slurries also have this problem because such slurries typically include water. A common pathway for dissolution of ions from ceramics is believed to involve hydration of surface ions. "Hydration" means that the ceramic particles react with water to form a chemical bond. The compounds formed by hydration are referred to as hydrates. Surface ions adsorb water, react with the adsorbed water to form hydrates, and then dissolve.

Aging is defined as any change in a slurry property or properties versus time. Hydration of refractory powders results in slurry aging by, for example, increasing slurry viscosity. Aging can contribute to lower shell quality in many ways. For example, as ceramic materials dissolve, the dissolved species may substantially change the ionic strength of the solution and consequently the particles agglomerate. This can adversely affect mechanical properties of the constructed shell. Furthermore, if the ionic charge of the species that dissolves is different from the ionic charge of the ceramic particles or other components of the slurry (e.g., the ceramic particles have negative charge, but the dissolving species have positive charge or vice versa), then the dissolving species preferentially may adsorb onto different components of the slurry. This may change the theological (the deformation and flow of matter) properties of the slurry, as well as other slurry properties of interest. Finally, as ceramic materials react with water, some ions preferentially may dissolve relative to others, which consequently changes the ratio of ions in suspension and solution. This may result in changes in the physical or chemical properties of the ceramic.

Commercial dip-coating processes require using large volumes of slurries. It may take weeks or months before the entire quantity of a particular slurry is consumed. Unfortunately, slurry aging typically requires that the slurry be discarded well before the entire quantity of the slurry initially formulated can be used to form casting molds. This is both costly and wasteful.

Powders used to make casting slurries are substantially free of surface hydroxides immediately after being manufactured at high temperatures. Slurry materials may be exposed to high temperatures during the initial manufacturing processes and during any subsequent fusion or sintering processes. Fusion and sintering are two methods used to increase the particle size of refractory powders. Fusion involves heating a powder above its melting point to produce a liquid. The liquid is cooled, re-crystallized and ground into a more desirable particle size distribution. Sintering involves fusion of fine particles upon heating at temperatures below the complete melting point of the powder. When sintering is complete, the sintered material is ground to a desirable powder size.

However, once the manufactured powders are exposed to ambient water in the atmosphere, hydration begins. Because refractory powders are bulk manufactured and often transported over long distances, it is not always practical or cost-efficient to either use or adequately seal the powders immediately after they are manufactured. Moreover, even if the powders are sealed at the factory sufficient to prevent hydration, which generally is not the case, a consumer who does not use all of the powder once it is unsealed has to store the unused portion. Unless the powders are (1) used immediately after they are manufactured, or (2) sealed in a water-free container immediately after they are manufactured and subsequently used immediately after unsealing, they will undergo surface hydration. In practice, neither 1 nor 2 are practicable; hence, refractory powders typically used to form casting slurries are hydrates.

Hydration of refractory materials may be temporarily reduced by the consumer if the consumer undertakes further processing of the powders, for example by sintering or fusing the powders, after they are received from the original manufacturer. However, the resulting powders immediately begin to rehydrate unless steps are taken to prevent hydration.

A number of solutions have been offered to control aging of investment casting slurries. Horton's U.S. Pat. No. 4,947,927 shows that increasing the pH to above 11 can reduce aging of yttria slurries. This is because yttria dissolution decreases with increasing pH. However, maintaining yttria slurry pH in a production environment above 11 at all times is inconvenient and impractical. Furthermore, compositions exhibit increased toxicity as the pH varies significantly from neutral.

Yasrebi et al.'s U.S. Pat. Nos. 5,407,001 and 5,643,844 teach decreasing the overall dissolution rate of an oxide by doping the oxide with a material having a lower solubility in the slurry medium, typically water, than the oxide. Consequently, slurry aging can be reduced. Coating powder surfaces with a protective layer also can reduce slurry aging.

Yasrebi et al., U.S. Pat. No. 5,624,604, shows that adsorption of hydroxylated benzoic acid onto the surface of rare earth oxides reduces their dissolution rate and thereby reduces slurry aging.

Persons skilled in the art of ceramic processing have long sought simple and inexpensive methods to increase the lifetime of casting slurries. Despite the prior inventions directed to this objective, there still is a need for convenient and practical methods for increasing the useful lifetimes of investment casting slurries.

SUMMARY

This disclosure describes embodiments of a method for increasing the lifetime of a casting slurry. Slurry materials are processed to provide a substantial increase in the lifetime of a slurry made using such processed materials compared to slurries made using materials that are not processed as described herein.

One embodiment for increasing lifetime of a casting slurry comprises processing at least one slurry material by heat processing and/or vacuum processing. Heat processing temperatures and times depend on the furnace type used for the heat processing, but typically heat processing is continued for a period of time of from about 0.1 second to about 4 days at a temperature of from about 100° C. to about 1,320° C., with working embodiments generally heat processing at a temperature of from about 800° C. to about 900° C. For a flash furnace, heat processing times can be quite short, such as for a period of seconds, or fractions of seconds, whereas rotary or batch furnaces require longer heating periods ranging from a few hours to several days. The slurry material also can be vacuum processed at a pressure less than ambient for a period of time sufficient to increase slurry lifetime of a slurry made from the processed slurry material, which again may be for a period of seconds, or fractions of a second, to several days.

A casting slurry is then made using the processed slurry material, where the lifetime of the slurry is increased compared to a slurry formed without processing the slurry material subsequent to its initial commercial production. Without limiting the invention to a particular theory of operation, it may be that the slurry material processing conditions are sufficient to reduce slurry material hydration from a first hydration level to a second hydration level such that the lifetime of the slurry is increased compared to a slurry formed without reducing the hydration level of the material subsequent to its initial commercial production.

A more particular embodiment of the disclosed method for increasing the lifetime of a casting slurry comprises heat processing at least one slurry material, typically refractory powders which have undergone hydration subsequent to commercial production, for a period of time sufficient to reduce the amount of hydration from a first hydration level to a second hydration level. A slurry is formed using the slurry material at a hydration level which provides an increased slurry lifetime relative to the same material without processing according to the method of the present invention. Slurry formation can be accomplished substantially immediately after processing, or up to about one week after processing, typically less than 24 hours after processing, and even more typically within 2 hours to about 8 hours after processing. If the material is stored under a substantially water-free atmosphere, then the hydration level still will be less than the first hydration level when used at a later date. Thus, processed slurry materials can be used indefinitely if stored in this fashion.

The temperature and the time associated with processing the slurry material can be selected based on considering the extent to which slurry lifetime is increased. This can be measured using, for example, isoelectric points. One embodiment of the method comprises heating the slurry material, such as refractory powder, for a period of time sufficient to change the isoelectric point of the material from an initial pH to a second pH, such as where the initial and second isoelectric points differ by at least 0.5 pH unit, even more preferably by greater than at least 1.0 pH unit, and even more preferably by at least 1.5 pH units. Heat processing also can be done within particular temperature ranges, which is best determined with reference to particular materials. For zircon, yttria and alumina, working embodiments of the method have heated such materials at temperatures of from about 400° F. (about 200° C.) to about 2,400° F. (about 1,315° C.) for a period of time of from about 0.1 second to about 4 days, typically about 1.5 seconds in flash furnaces, 1 hour in rotary furnaces, and 4 hours in batch furnaces for working embodiments. For other materials the processing times and temperatures can be readily determined by measuring a property of the material with respect to time and temperature. Typically, properties useful for assessing the sufficiency of processing include viscosity, dissolved ion concentration and particle size of a slurry formed from the processed material.

Working embodiments of the disclosed method typically comprised providing at least one refractory powder selected from the group consisting of materials comprising zircon, yttria, zirconia, alumina, and mixtures thereof. "Materials comprising" indicates that such materials can include other materials, including co-fused materials, doped materials, etc. The selected refractory powder was heat processed as described above, with the temperature and period of time used for heat processing being sufficient to change isoelectric point as measured in an aqueous medium. A slurry was formed using the processed powder within a time period after heating, the time period being selected such that the lifetime of the slurry was extended by at least 10% or greater, and up to at least 300% or greater, of the lifetime of a slurry formed without processing the powder according to the method of the present invention.

DETAILED DESCRIPTION

Embodiments of the present method increase the lifetimes of slurries made from slurry materials, such as refractory powders, by processing materials subsequent to commercial production. This processing currently is believed to reduce the amount of hydration before the materials are incorporated into slurries. As a result, "processing" refers to any process whereby the hydration level of a material can be reduced from a first level to a second, lower hydration level, such as heat processing materials, desiccating materials, vacuum or partial vacuum processing materials, and combinations of these methods. As used herein, "increasing the lifetime of a slurry" refers to increasing the lifetime of a slurry made from a processed slurry material, such as a refractory powder, compared to the lifetime of a slurry made from the same slurry material, in the absence of processing. This increase generally is at least 10% and greater, and up to at least 300%, of the lifetime of a slurry made without first processing the slurry materials as described herein.

Without limiting the present invention to a theory of operation, based on data presented herein the dissolution rate of slurry material in slurries appears to be related to the extent to which the slurry materials are hydrated at the time they are added to a slurry medium, such as water, an alcohol or alcohols, and combinations thereof. Therefore, if surface hydration can be substantially reduced or eliminated from the slurry materials as received from the manufacturer prior to their addition to a slurry mixture, slurry lifetime can be extended. It has been discovered that surprising increases in the lifetime of a slurry can be achieved by a convenient and inexpensive processing, such as heat processing slurry materials that have undergone hydration subsequent to manufacture prior to their addition to a casting slurry mixture.

A. Slurry Materials

All slurry materials that hydrate may be processed according to the method of the present invention to increase the lifetime of slurries made using the processed slurry materials. As used herein, "slurry materials" include metals and/or metalloids, materials comprising metals and/or metalloids, for example, non-refractory materials comprising metals and/or metalloids, refractory metals (e.g., tantalum, tungsten, and rhodium), refractory metalloids, and refractories materials comprising metals and/or metalloids. Slurry materials comprising metals and metalloids include oxides, nitrides, phosphides, sulfides, carbides, fluorides, and oxyfluorides of metals and metalloids, and combinations thereof. Without limitation, particular examples of slurry materials comprising metals and/or metalloids include rare earth metal oxides, for example the oxides of elements 57 to 72 (i.e., the elements lanthanum, cerium, praseodymium, neodymium, promethium, samarium, europium, gadolinium, terbium, dysprosium, holmium, erbium, thulium, ytterbium, lutetium, and hafnium), oxides of the elements vanadium, yttrium, aluminum, zirconium, titanium, silicon, magnesium, calcium, tantalum, tin, gallium, indium, beryllium, thorium, boron, scandium, ruthenium, rhodium, iridium, palladium, platinum, copper, germanium, bismuth, tellurium, neptunium, uranium, plutonium, and combinations of these materials. Particular examples of oxides of the above-listed elements include vanadia, yttria, alumina, zircon, zirconia, titania, silica, magnesia and calcia. Silicon nitride and yttrium carbide also are particular examples of slurry materials comprising metals and/or metalloids. Other slurry materials that can be processed according to embodiments of the presently disclosed method to increase slurry lifetime include aluminosilicate materials, such as cordierite, mullite and the like. Chemical and physical combinations of the above-listed materials are useful for forming slurries and can be processed according to techniques disclosed herein to increase slurry lifetime. Exemplary combinations include titania and alumina, zirconia and alumina, titania and silica, and the like. Similarly, three or more refractory materials, such as those listed above, can be combined to yield a mixture for forming slurries having increased slurry lifetime according to embodiments of the present method.

Moreover, the slurry materials used to make the slurry can be processed by other methods designed to increase slurry lifetime, and still benefit by processing according to the method of the present invention. Thus, slurry materials which have been, for example, co-fused or sintered with other slurry materials (e.g., less hygroscopic slurry materials), or which have been doped with other slurry materials, also can be processed according to the method of the present invention to reduce hydration levels to increase slurry lifetime. Examples of co-fused and doped materials are described in U.S. Pat. Nos. 5,407,001 and 5,643,844, which are incorporated herein by reference.

B. Measuring Surface Hydration Levels

The extent of refractory material hydration can be evaluated by one or more methods, including rate of change in viscosity, dissolved ion concentration, particle agglomeration, isoelectric point in zeta potential measurements, and combinations thereof. All of these techniques work for most slurry materials; however, for some materials more than one measurement may be needed for more accurate evaluations.

The extent of hydration can be measured readily by forming a slurry and measuring its viscosity. Viscosity versus time curves illustrate that initially the viscosity of slurries decreases as particles disperse and inter-particle bonds break. Typically slurry viscosity stabilizes for a period of time during which viscosity remains relatively constant. However, as the slurries begin to age, slurry viscosity increases. Rate of change in viscosity of a suspension versus time is an indication of the extent of a material's hydration. Materials with a higher level of hydration show a higher rate of increase in viscosity as compared to the same material having a lesser amount of hydration.

Hydration also can be determined by dissolution measurements. Dissolution measurements comprise suspending refractory materials in water and measuring the concentration of dissolved or leached ions. The concentration of many ions, such as metal ions, can be readily determined as is known to those of ordinary skill in the art by a variety of techniques, including Inductively Coupled Plasma (ICP) optical emission spectrometry. The lower a material surface hydration the slower ion dissolution occurs with concomitantly lower dissolved ion concentrations.

Refractory material hydration also can be correlated with slurry particle agglomeration of some components of the slurry. In general, refractory materials having higher hydration levels yield higher rates of agglomeration for other slurry materials, particularly binder components, for example, latex binders and silica binders, such as colloidal silica materials, including nano-size colloidal silica binder in the investment casting slurries. As the particle size increases, viscosity increases, rendering the slurry more difficult and eventually impossible to use to form casting slurries. Particle size can be measured by ultrasound or laser diffraction, among other techniques known to those of ordinary skill in the art.

The extent of refractory material hydration can be determined using zeta potential measurements of a colloidal suspension of refractory powder in deionized water. The zeta potential is the potential across the diffused layer of ions surrounding charged particles in a suspension. Zeta potential measurements are used to determine the magnitude and the sign of a particle charge. The pH at which the particle has no net positive or negative charge is called the isoelectric point. The isoelectric point corresponds to the pH at which the zeta potential is zero.

The surface of a slurry material in solution may be negatively or positively charged. The magnitude and the sign of the surface charge will depend on the pH of the solution, ionic strength, and on the particular material selected. For example, at pH values greater than about 8.5, the surfaces of typical refractory materials are negatively charged. When a slurry material is exposed to ambient humidity a layer of adsorbed water molecules forms on the surface of the material. This process is known as hydration. At sufficiently high temperatures water molecules desorb from the surface. This process is known as dehydration. Further ionization of hydroxyl groups on the surface of the material produces a surface charge. The density of surface hydroxyl groups on the surface of a particle depends on the chemical nature and the thermal history of the slurry material. Therefore, changes in the isoelectric point of a slurry material suspended in deionized water reveals changes in the amount of material surface hydration. Generally, a change of about 0.5 pH units in the isoelectric point of a material is sufficient to produce a measurable change in the aging characteristics of a slurry made from that material.

However, zeta potential does not accurately measure hydration for certain materials comprising more than one metal and/or metalloid. For example, the hydration level of zircon may not be accurately reflected by zeta potential measurements. Without limitation to theory, the independence of isoelectric point shift in zeta potential from hydration level for zircon is thought to arise from the presence of both zirconium and silicon bound hydrates, which have opposite directions in their isoelectric point shifts.

C. Processing Refractory Materials

The following discussion concerns processing refractory materials. It should be understood that such processing can apply to other slurry materials, and is not limited to processing refractory materials.

The lifetime of a slurry can be dramatically increased by processing refractory materials to reduce the hydration level. Any method by which the surface hydration level can be reduced can be used to practice the present invention. This includes heat processing, and/or vacuum or partial vacuum processing of refractory materials, desiccating refractory materials, and combinations of these methods.

Heat processing comprises heating a refractory material at a temperature or a variable temperature, and for a period of time, sufficient to decrease the amount of hydration from a first hydration level to a second hydration level. As used herein, "first hydration level" typically refers to the amount of hydration of a material as it is used and results from hydration of the material subsequent to its manufacture by the commercial vendor. Thus, the method is suitable for any refractory material that has undergone hydration or rehydration after manufacture.

The temperature to which a given refractory material should be heated, and the period of time for which the heating should continue, will depend on both the nature of the refractory material and on the desired level of dehydration. There is a time-temperature relationship, and time is an important consideration for commercial applications. Theoretically, any temperature at which dehydration will occur is a sufficient minimum heat processing temperature, but such temperature may be impractical commercially. Generally, the material should be heated to at least about 100° C. and preferably at least about 200° C. Working embodiments of the present invention have heated refractory materials in an oven set at temperatures of from 400° F. (200° C.) to about 2,400° F. (1,320° C.), generally from about 1450° F. to about 1,650° F. (about 800° C.—to about 900° C.), with working embodiments typically being heat processed at a temperature of about 1,600° F. (871° C.). Higher temperatures are desirable because they increase the rate and/or the extent of dehydration. Thus, processing materials at a higher average temperature generally requires less time to achieve the desired amount of dehydration. The refractory materials typically are cooled to a temperature suitable for handling and slurry formation, such as ambient temperature. Cooling can occur under a water-free environment, or substantially water-free environment, but this is not necessary.

In particular embodiments, both the temperature at which the powder is heated and the duration of the heating period are selected such that the isoelectric point of the slurry material changes. The change in isoelectric point should be at least about 0.5 pH unit or greater, preferably at least 1.0 pH unit or greater, and even more preferably 1.5 pH units or greater as a result of heat processing.

In other embodiments the temperature at which the powder is heated and the duration of the heating period are determined by using a decrease in the rate of ion dissolution, viscosity measurement, particle agglomeration measurement, and combinations of these techniques. Typically a decrease of from about 10% in the rate of change in viscosity, dissolved ion concentration, or particle size relative to unprocessed powder indicates that the powder has been processed at a sufficient temperature for a sufficient period of time to be useful for increasing useful slurry life relative to slurry materials as received from the manufacturer. In particular examples, slurry material is processed such that there is a greater than 95% decrease in the rate of change in at least one of viscosity, dissolved ion concentration, and particle size.

Refractory materials also can be subjected to a vacuum, or at least a partial vacuum, to reduce the hydration level. This process involves placing refractory material in a container having sufficient strength and impermeability to be useful for drying refractory materials under reduced pressure. Again, the refractory material is subjected to the reduced pressure for a sufficient time to reduce the hydration level as measured, for example, by zeta potential.

Refractory materials also may be dried by desiccation, for example by placing refractory materials in an air-tight container along with a dessicant. Examples of dessicants include silica gel, anhydrous magnesium perchlorate, barium oxide, alumina (anhydrous), phosphorus pentoxide, anhydrous lithium perchlorate, anhydrous calcium chloride, ascarite, anhydrous calcium sulfate, sodium hydroxide, anhydrous barium perchlorate, anhydrous calcium oxide, anhydrous magnesium oxide, and potassium hydroxide. Combinations of desiccants can be used, as well as combining two or more of heat processing, vacuum processing, desiccation, etc.

D. Casting Slurry Components

Once the slurry materials are processed as described above, such materials may be incorporated into a casting slurry. A typical casting slurry is composed of three components: (1) a refractory system, (2) a binder system, and (3) a solvent system. These three components each may include more than one component. For example, a refractory system may include plural refractory powders having different chemistries and particle sizes. Similarly, a binder system may include a combination of inorganic binders, with or without additional organic binders. Since the late 1940's, when partially hydrolyzed ethyl silicate binder was introduced for investment casting application, silica-based binders have remained a universally favored inorganic binder for investment casting applications. A commonly used silica binder is either an aqueous nanometer size, colloidal silica suspension or an ethyl silicate. Besides silica binders, organic emulsions or solution binders also may be used in slurries. The type of binder system dictates the type of solvent system used in a slurry preparation. A mixture of alcohol and low molecular weight organic molecules are commonly used with ethyl silicate. When colloidal silica is used, deionized water typically is used. In order to control surface tension and air bubble formation in aqueous slurries, a minor amount of surfactant and antifoaming agent may be added. Other minor ingredients also may be added at the discretion of the individual foundry.

If the slurry material is not going to be stored in an atmosphere which substantially prevents surface rehydration, then the refractory material, or materials, preferably but not necessarily should be added to the slurry mixture substantially immediately after they have been processed. Adding slurry materials "substantially immediately" means adding them at any time before they rehydrate to the extent that the lifetime of a slurry formed from the heat-processed powders is not increased compared to the lifetime of a slurry formed from the same materials in the absence of heat-treatment. Furthermore, a slurry material has been added to a slurry mixture "substantially immediately" after processing if, at the time of addition, the isoelectric point of the powder has changed, i.e. either increased or decreased, by at least 0.5 pH units as the combined result of the processing and any hydration subsequent to processing. The duration of the time period encompassed by "substantially immediately" will depend on the nature of the slurry material, the extent to which the material underwent dehydration during processing, such as heat-treatment, and the ambient conditions, such as temperature and humidity.

E. Measuring Slurry Lifetime

The increased lifetime of a slurry made with a slurry material or materials processed according to the method of the present invention can be measured in several ways. For example, increased slurry lifetime is evidenced by comparing the time dependence of the concentration of dissolved slurry material in an aqueous suspension made with a slurry material processed according to embodiments of the method disclosed herein to the same suspension made without first processing the slurry material. Over some finite time-scale, the suspension made with the processed slurry material will maintain a lower concentration of dissolved material as a function of time.

Another way to test for increased lifetime is to monitor the time dependence of the size of particle cluster formation in a casting slurry. Similarly, the viscosity of a casting slurry as a function of time may provide information on the useful lifetime of a given slurry.

To further illustrate the heat-processing method, the following examples are provided. These examples are to be considered as exemplary only and in no way limiting the invention to the particular features stated.

EXAMPLE 1

Example 1 describes one embodiment of a process for heat-treating alumina powders. The isoelectric points of the heat-processed powder are compared to the isoelectric point of a non heat-processed alumina powder.

Alumina powder (325 mesh and >99.9% purity) was obtained from Alcoa (Pittsburgh, Pa.). The powder was delivered hydrated in an air/water-permeable container. A control alumina suspension was made by adding 0.01 grams of alumina powder to 400 grams of deionized water with continuous stirring to form a suspension. The pH of the suspension was adjusted by adding 0.01 N HCl and 0.01 N NaOH. Zeta potential measurements were taken at various solution pHs using a Zetasizer 4 instrument from Malvern (Worcestershire, UK). The results of these measurements are shown in FIG. 1.

Six 30 gram samples of alumina powder were provided and heated separately in an oven. The samples were heated to 2,400° F., 1,600° F., 1,300° F., 1,100° F. and 500° F. The oven temperatures were maintained for 4 hours. Within 60 minutes of being removed from the oven, 0.01 gram of each sample was added to 400 ml of deionized water and stirred to form a suspension. The pH of each suspension was adjusted by adding 0.01 N HCl and 0.01 N NaOH. Zeta potential measurements were taken at various solution pHs using a Zetasizer 4 instrument from Malvern.

Figure 1:
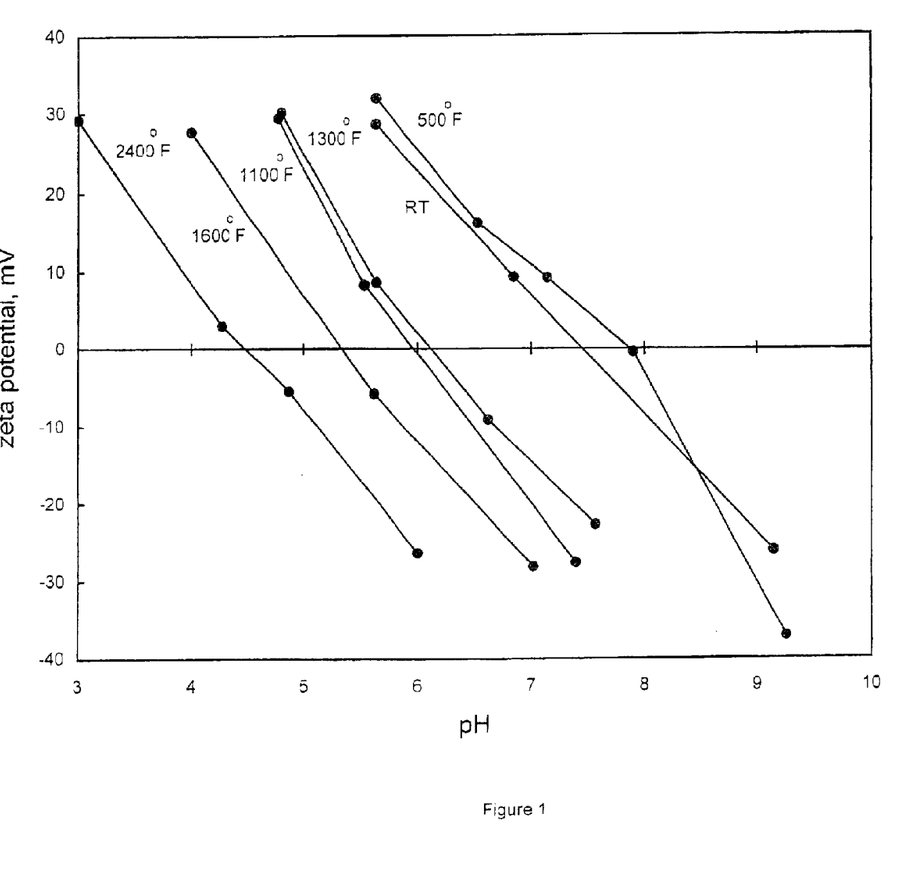
FIG. 1 is a graph of pH versus zeta potential for slurry materials heated at temperatures of from about room temperature to about 2,400° F. (about 1,300° C.).

The zeta potential versus pH curves for the alumina suspensions are shown in FIG. 1. The data show that the isoelectric point of the alumina, within experimental error, generally decreases for powders that are heated to higher temperatures.

EXAMPLE 2

Example 2 describes heat-processing yttria powder. The isoelectric point of the heat-processed powder is compared to the isoelectric point of a non heat-processed yttria powder.

Hydrated yttria powder (325 mesh) was obtained from Treibacher Company (Althofen, Austria). A control yttria suspension was made by adding 0.01 gram of yttria powder to 400 grams of deionized water with stirring to form a suspension. The pH of the suspension was adjusted by adding 0.01 N HCl and 0.01 N NaOH. Zeta potential measurements were taken at various solution pHs using a Zetasizer 4 instrument from Malvern.

Thirty grams of the yttria powder were placed in an oven and heated to 1,600° F. The powder was maintained at that temperature for four hours. 0.01 gram of yttria was added to 400 grams of deionized water and stirred to form a suspension. The pH of the suspension was adjusted to 11.5 by adding tetraethylammonium hydroxide (TEAOH). The pH was further adjusted by adding 0.01 N HCl and 0.1 N TEAOH. Zeta potential measurements were taken at various solution pHs using a Zetasizer 4 instrument from Malvern. One set of measurements was taken within 60 minutes of forming the suspension. Another set was taken approximately one day after the formation of the suspension. The final set of measurements was taken 15 days after suspension formation.

Figure 2:
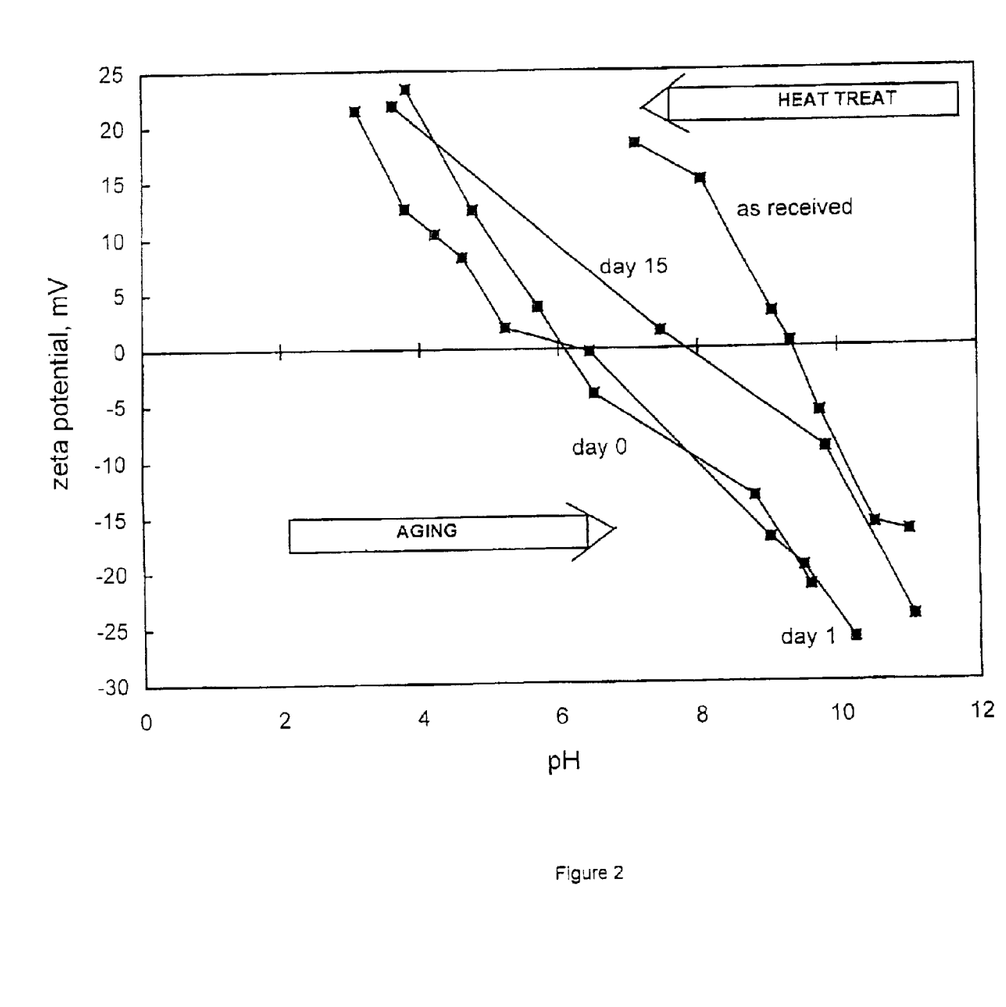
FIG. 2 is a graph of pH versus zeta potential, which illustrates changes in zeta potential versus a control over time.

The zeta potential versus pH curves for the yttria suspensions are shown in FIG. 2. The data show that the heat-processed flour has an isoelectric point of about 6 soon after it is added to the deionized water, compared to an isoelectric point of about 9.5 for the non heat-processed powder. The data also show that even after 15 days in solution, the isoelectric point of the heat-processed yttria remains lower than the isoelectric point of non heat-processed yttria.

EXAMPLE 3

Example 3 demonstrates the retardation of alumina dissolution in an aqueous suspension made with powder that has been heat-processed according to embodiments of the present method.

Hydrated alumina powder was obtained from Alcoa. A control alumina suspension was made by adding 200 grams of alumina powder to 500 ml of deionized water with stirring to form a suspension. The pH of the control suspension was adjusted to 0.01 using 0.1 N HCl.

Two hundred grams of the alumina powder were heated in an oven at 1,600° F. for 4 hours. After cooling, 200 grams of the powder were added to 500 ml of deionized water and stirred to form a suspension. The pH of the suspension was adjusted to 0.01 using 0.1 N HCl.

The control suspension and the suspension made from the heat-processed alumina were placed in separate plastic bottles. The bottles were rolled on a roller and 50 ml samples were taken from each bottle periodically. The collected samples were centrifuged for 1 hour at 2,000 rpm. The top half of the supernatant was then drained off and the concentration of dissolved aluminum was measured using inductively coupled plasma tests.

Figure 3:
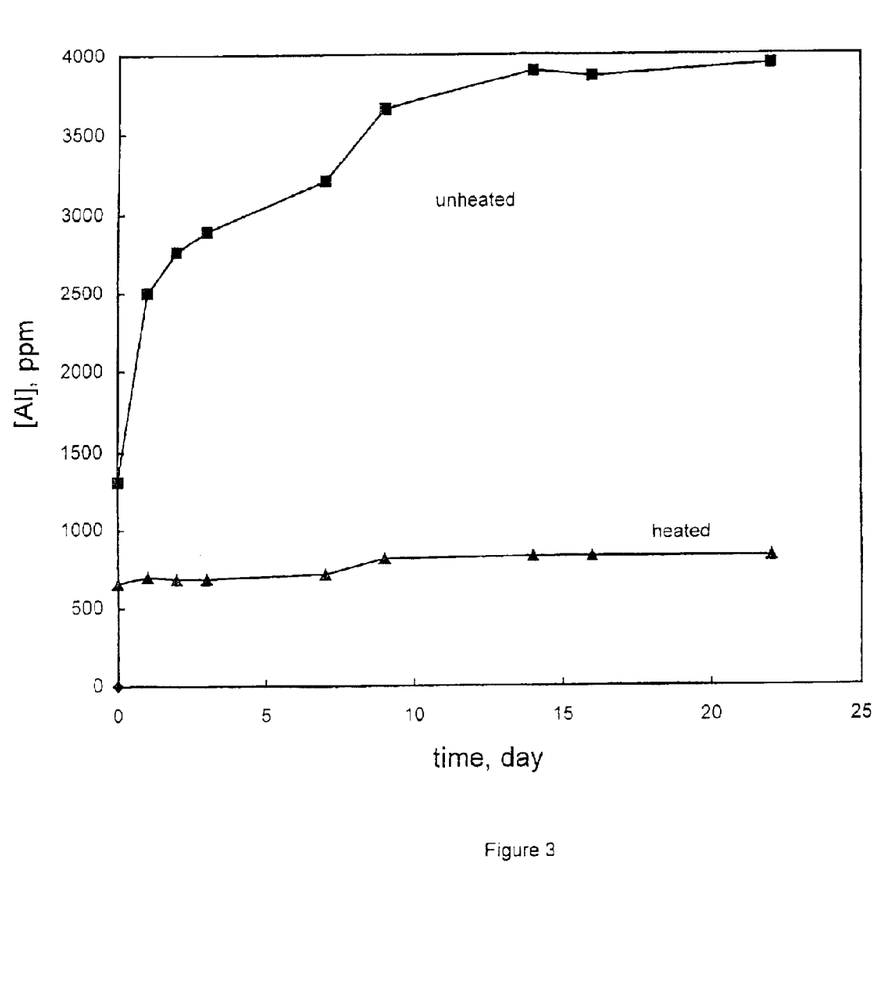
FIG. 3 is a graph of time (days) versus aluminum concentration for alumina slurry materials processed according to the method of the present invention versus a control.
Figure 4:
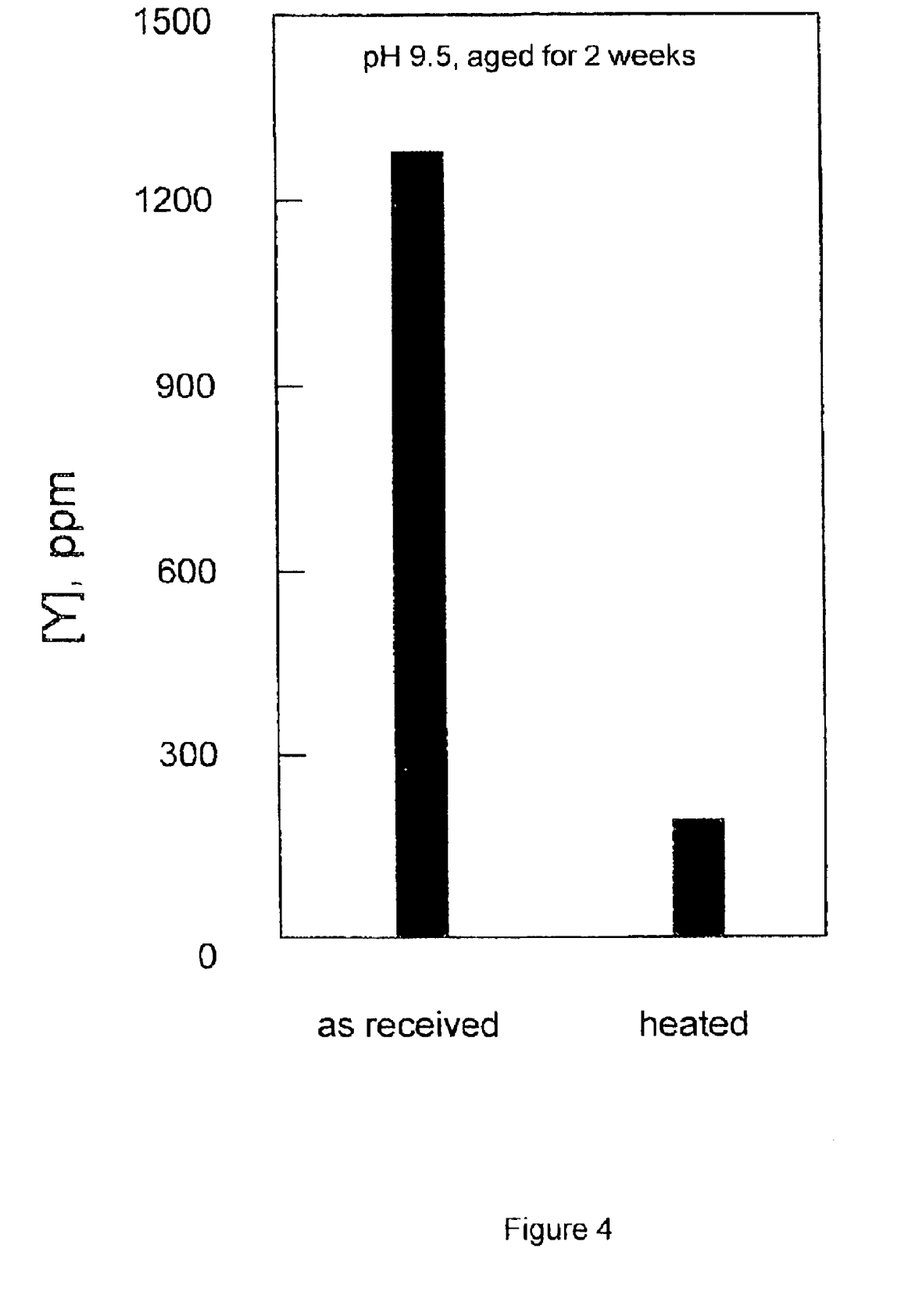
FIG. 4 is a bar graph of yttrium concentration for yttria slurry materials processed according to the method of the present invention versus a control over time.
Figure 5:
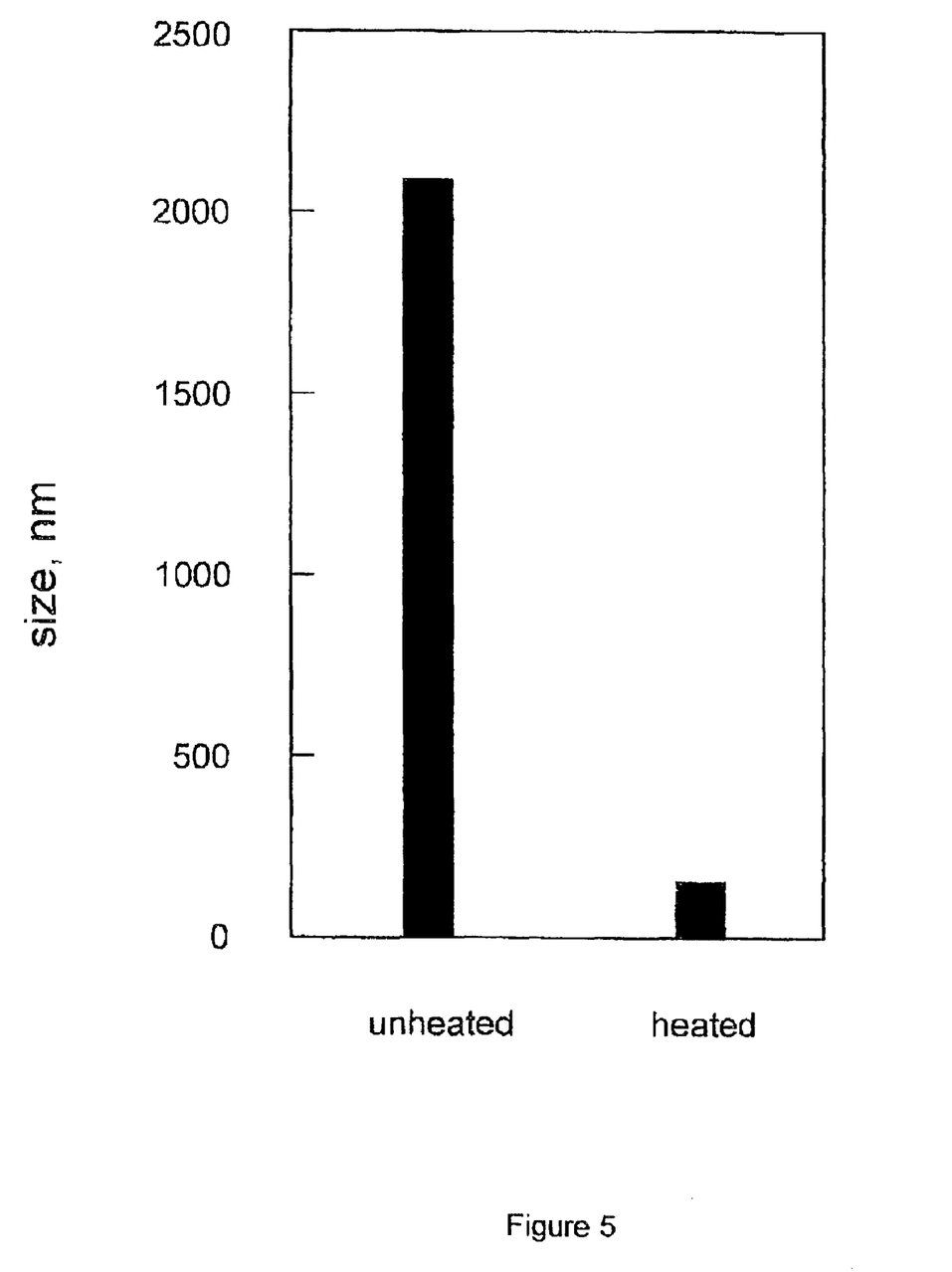
FIG. 5 is a graph illustrating particle size of silica agglomerates processed according to the method of the present invention versus a control.

The dissolved aluminum concentration versus time curves are shown in FIG. 3. These data show that the concentration of dissolved aluminum in the control is substantially higher than in the suspension made with heat-processed powder and that dissolved aluminum concentration in the control is about four times higher after 22 days.

EXAMPLE 4

Example 4 demonstrates the retardation of yttria dissolution in an aqueous suspension made with powder that has been heat-processed according to embodiments of the present method.

A control suspension and a test suspension were made according to Example 3, except that hydrated yttria powder, obtained from Treibacher, was used in place of the alumina powder. Both suspensions were placed into bottles that were rolled on a roller for 2 weeks. At the end of two weeks a 50 ml sample of each suspension was removed from each bottle. The collected samples were centrifuged for 1 hour at 2,000 rpm. The top half of the supernatant was then removed and the concentration of dissolved yttrium was measured using inductively coupled plasma tests. The results of these tests showed that 1,300 ppm yttrium ions had dissolved in the control sample after two weeks while only 200 ppm yttrium ions had dissolved in the sample made from heat-processed yttria powder during the same time period.

EXAMPLE 5

Example 5 describes the formation of an alumina-tetraethylorthosilicate (TEOS) casting slurry. This example also demonstrates the effectiveness of the heat-processing method at slowing the aging rate of an alumina-TEOS casting slurry.

A control alumina slurry was made as follows. Alumina powder was obtained from Alcoa and added to deionized water with continuous stirring. The powder was added to the deionized water, isopropyl alcohol, TEOS, ethyl alcohol, and dipropyleneglycolmonoethyl ether (DPM). The amounts and weight percentages of each component in the mixture is listed in Table 1.

A second slurry was made as described above with alumina powder that had been heated to 1,600° F. for 4 hours. The weight percentages of each component in the mixture also are as listed in Table 1.

TABLE 1

| Material | Weight Percent |
|---|---|
| Deionized Water | 1.5 |
| TEOS, Silbond | 4.98 |
| Isopropyl Alcohol | 9.23 |
| Ethyl Alcohol | 2 |
| DPM | 0.74 |
| Alumina | 81.55 |

The slurries were placed in separate bottles, which were rolled on a roller for 35 days. After 35 days a 50 ml sample was removed from each bottle. The samples were centrifuged for 1 hour at 2,000 rpm. The top half of the supernatants were then collected and the size of the TEOS clusters contained therein were measured by light scattering experiments using a Zetasizer 4 machine from Malvern. The results of these experiments showed that the TEOS clusters in the control grew to 1,787 nm, while those in the slurry made with heat-processed powder grew to only 143 nm in diameter.

The slurry made with the heat-processed powder will have a longer lifetime because aggregate formation, which leads to slurry aging, has been retarded.

EXAMPLE 6

Example 6 describes the formation of a casting slurry and demonstrates the effectiveness of the heat-treatment method at increasing slurry lifetime by slowing the rate of particle agglomeration in the slurry. The extent of agglomeration was monitored by measuring the viscosity of the slurry. As particle agglomeration increases, the viscosity of the slurry increases.

A control yttria slurry was made as follows. Yttria powder having an average particle size of 15 $\mu$m was obtained from Treibacher Company and added to deionized water with continuous stirring using a high-shear mixer at 3,000 rpm. Latex (Dow 460 NA), surfactant (Aerosol OT), antifoaming agent (Dow Corning 65 Additive), and colloidal silica (Du Pont Ludox SM) were then added to the slurry with continued stirring. The amounts and weight percentages of each component in the mixture are listed in Table 2.

A second slurry was made as described above with yttria powder that had been heated to 1,600° F. for 4 hours. The weight percentages of each component in the mixture used in the second slurry were the same as those used in the first slurry and also are as listed in Table 2.

TABLE 2

| Material | Weight Percent |
|---|---|
| Deionized Water | 5.1 |
| Latex | 1.9 |
| Surfactant | 0.2 |
| Colloidal Silica | 7.9 |
| Defoamer | 0.1 |
| Yttria | 85 |

Figure 6:
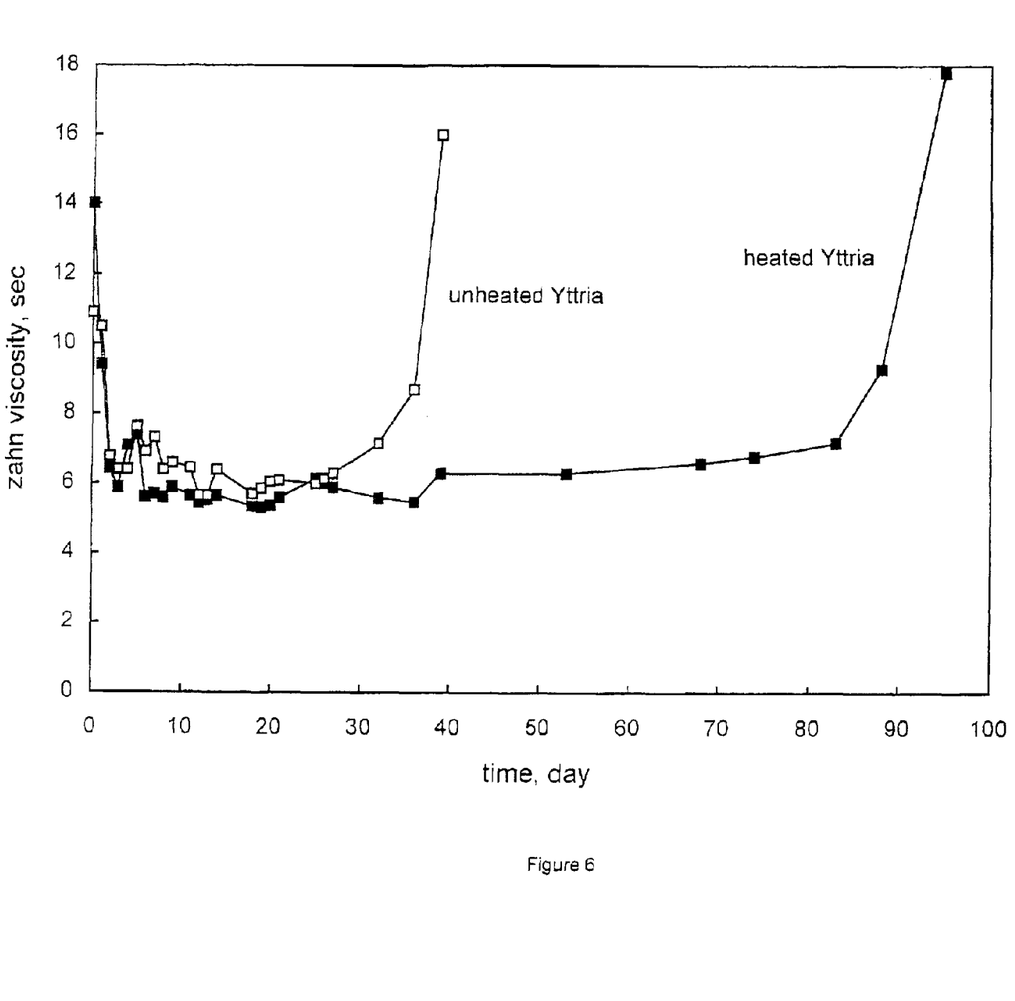
FIG. 6 is a graph of time (days) versus Zahn viscosity for yttria materials processed according to the method of the present invention versus a control.

The viscosity of the slurries was measured periodically using a Zahn viscosity cup #4, made by Gardco Company. The Zahn viscosity versus time curves are shown in FIG. 6. Initially the viscosity of both slurries decreased, apparently while inter-particle bonds break. Then the slurries stabilized for a period of time during which their viscosities remained relatively constant. As the particles in the slurries began to gel, however, slurry viscosity increased. Once the viscosities have increased sharply, as shown in FIG. 6, the slurries are no longer stable and the useful lifetime of the slurry is over. The results in FIG. 6 show that the slurry made with the heat-processed particles had a lifetime of about 80 days, while the control slurry had a lifetime of only about 30 days.

EXAMPLE 7

Example 7 describes the formation of an alumina-TEOS casting slurry. This example also demonstrates the effectiveness of heat-treatment at increasing slurry lifetime by slowing the rate of TEOS agglomeration. The extent of agglomeration was monitored by measuring slurry viscosity. As TEOS agglomeration increases, slurry viscosity increases.

Figure 7:
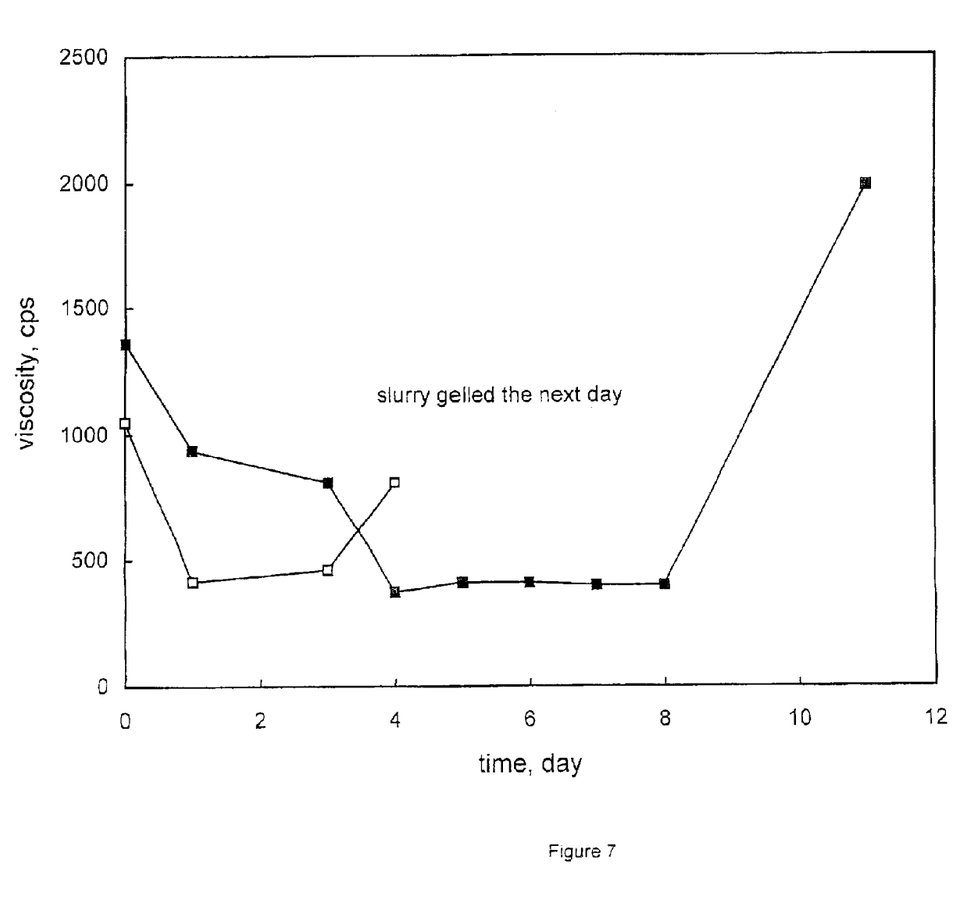
FIG. 7 is a graph of time (days) versus viscosity (cps) for slurries made with materials processed according to the method of the present invention versus a control.

Alumina-TEOS slurries were made according to Example 5. The slurries were placed in an oven at 113° F. and viscosities were measured periodically using a Brookfield tabletop viscometer at 6 rpm. The viscosity versus time curves are shown in FIG. 7. Initially the viscosity of both slurries decreases, apparently while inter-particle bonds break. The slurries thus stabilize for a period of time, during which their viscosities remain relatively constant. As the slurries begin to gel, however, slurry viscosity increases. Once the viscosities have increased sharply, as shown in FIG. 7, the slurries are no longer stable and the useful lifetime of the slurry is over. The results in FIG. 7 show that the slurry made with heat-processed particles have a lifetime of about 8 days, while the control slurry has a lifetime of only about 3 days.

EXAMPLE 8

Example 8 describes processing materials comprising zircon. The procedure described herein can be used for any material, but is particularly useful for multicomponent flours, including, without limitation, zircon, mullite, cordierite and the like.

Trebol 325 mesh zircon flour and Aluchem ACZ 400 mesh zircon flour were heat treated at 1,400° F. (760° C.) for four hours, and compared to untreated zircon flour by dissolution measurement. 25 grams of the zircon flour samples were suspended in 40 grams of 0.25 N HCl solution and allowed to age for 60 hours. The supernatant of each sample was then analyzed using ICP optical emission spectrometry to determine the concentration of leached calcium, sodium, magnesium, and iron. As shown in Table 3 below, the heat-treated samples provided significantly lower leached ion concentrations, which is inversely correlated with slurry lifetime.

TABLE 3

| Material | Trebol 325 mesh | Trebol 325 | Aluchem ACZ 400 mesh | Aluchem ACZ 400 mesh |
|---|---|---|---|---|
| Calcining time and temperature | None | 1,400° F./ 4 hours | None | 1,400° F./ 4 hours |
| [Ca] (ppm) | 162 | 88 | 571 | 307 |
| [Na] (ppm) | 5 | 1 | 13 | 3.48 |
| [Mg] (ppm) | 8 | 2 | 14 | 5.26 |
| [Fe] (ppm) | 52 | 2.49 | 390 | 7.29 |

The present invention has been described with reference to several preferred embodiments. Other embodiments of the invention will be apparent to those of ordinary skill in the art from a consideration of this specification or practice of the invention disclosed herein. It is intended that the specification and examples contained herein be considered as exemplary only.

We claim:

1. A method for increasing lifetime of a casting slurry, comprising:
   processing at least one slurry material by a process selected from the group consisting of heat processing the material for a period of time of from about 0.1 second to about 4 days at a temperature of from about 100° C. to about 1,320° C., vacuum processing the at least one slurry material by subjecting the slurry material to a pressure less than ambient for a period of time of from about 0.1 second to about 4 days, and combinations thereof; and
   forming a slurry after processing the at least one slurry material, where the lifetime of the slurry is increased compared to a slurry formed without processing the at least one slurry material subsequent to its initial commercial production.

2. The method according to claim 1 where processing comprises heat processing at a temperature of from about 200° C. to about 1,320° C.

3. The method according to claim 1 comprising heat processing the material at a temperature of from about 800° C. to about 900° C.

4. The method according to claim 1 comprising heat processing in a flash furnace.

5. The method according to claim 4 comprising heat processing for a period of time of less than 1 minute.

6. The method according to claim 1 comprising heat processing in a rotary furnace.

7. The method according to claim 6 comprising heat processing in a batch furnace for a period of several hours.

8. The process according to claim 1 where the at least one slurry material has a hydration level and the at least one slurry material is processed for a period of time sufficient to reduce slurry material hydration from a first hydration level to a second hydration level.

9. The method of claim 8 where the lifetime of the slurry is increased compared to a slurry formed without reducing the hydration level of the material subsequent to its initial commercial production by heating.

10. The method according to claim 1 where the slurry material is used to form the slurry substantially immediately after processing.

11. The method according to claim 1 where processed slurry material is stored in a substantially water-free environment after processing.

12. A method for increasing a casting slurry lifetime, comprising:
   heating at least one slurry material for a period of time sufficient to reduce slurry material hydration from a first hydration level to a second hydration level; and
   forming a slurry substantially immediately after heating, where the casting slurry lifetime is increased compared to a slurry formed without heating the slurry material.

13. The method according to claim 12 where the slurry material is a refractory material, and heating comprises heating at least one refractory material for a period of time sufficient to change isoelectric point of the refractory material from an initial pH to a second pH.

14. The method according to claim 13 where an initial and second isoelectric points differ by at least 0.5 pH units.

15. The method according to claim 13 where an initial and second isoelectric points differ by at least 1.5 pH units.

16. The method according to claim 12 where the slurry lifetime is at least 10% greater than a slurry lifetime of a slurry formed without heating the refractory material.

17. The method according to claim 12 where the slurry lifetime is at least 200% as long as the lifetime of a slurry formed without heating the slurry material.

18. The method according to claim 12 where the slurry is an aqueous investment casting slurry.

19. The method according to claim 18 where the slurry material is a material comprising a metal, a metalloid, or combinations thereof.

20. The method according to claim 19 where the slurry material is selected from the group consisting of oxides, nitrides, phosphides, sulfides, carbides, fluorides, and oxyfluorides of metals and metalloids, and combinations thereof.

21. The method according to claim 20 where the slurry material is selected from the group consisting of oxides of the elements lanthanum, cerium, praseodymium, neodymium, promethium, samarium, europium, gadolinium, terbium, dysprosium, holmium, erbium, thulium, ytterbium, lutetium, hafnium, tantalum, tin, gallium, indium, beryllium, thorium, boron, scandium, ruthenium, rhodium, iridium, palladium, platinum, copper, germanium, bismuth, tellurium, neptunium, uranium, plutonium, vanadium, yttrium, aluminum, zirconium, titanium, silicon, magnesium, calcium, and combinations thereof.

22. The method according to claim 20 where the slurry material is selected from the group consisting of silicon nitride, yttrium carbide, and combinations thereof.

23. The method according to claim 21 where the slurry material is selected from the group consisting of yttria, alumina, zirconia, titania, silica, magnesia, calcia, zircon, mullite physical combinations thereof and chemical combinations thereof.

24. The method according to claim 23 where the slurry material is yttria.

25. The method according to claim 23 where the slurry material is alumina.

26. The method according to claim 23 where the slurry material is zircon.

27. The method according to claim 19 where the slurry material is an aluminosilicate.

28. The method according to claim 12 where the slurry material is a metal, a metalloid, or combinations thereof.

29. The method according to claim 28 where the slurry material is selected from the group consisting of tantalum, tungsten, rhodium, and combinations thereof.

30. The method according to claim 12 where heating comprises heating the slurry material at a temperature of from about 200° C. to about 1,320° C.

31. The method according to claim 30 where heating continues for a period of time of from about 30 minutes to about 4 days.

32. The method according to claim 12 where the slurry formed substantially immediately after heating has a viscosity, dissolved ion concentration, or particle size of at least about 10% lower than the slurry formed without heating the slurry material.

33. A method for increasing casting slurry lifetime, comprising:
   providing at least one refractory material, the material having undergone hydration subsequent to its manufacture to a first hydration level;
   heating the at least one refractory material for a period of time sufficient to reduce the first hydration amount to a second hydration amount;
   forming a slurry within a time period after heating, the time period being selected such that lifetime is extended compared to a slurry formed without heating the refractory material; and
   where heating reduces a leached ion concentration obtained from leaching the at least one refractory material by at least about 10%.

34. A method for increasing casting slurry lifetime, comprising:
   providing at least one refractory material, the material having undergone hydration subsequent to its manufacture to a first hydration level;
   heating the at least one refractory material for a period of time sufficient to reduce the first hydration amount to a second hydration amount;
   forming a slurry within a time period after heating, the time period being selected such that lifetime is extended compared to a slurry formed without heating the refractory material; and
   where heating comprises heating the refractory material at a temperature of from about 200° C. to about 1,320° C. for a period of time of from about 30 minutes to about 4 hours.

* * * * *